Aug. 9, 1932.   W. R. PAULSEN   1,870,264
REGULATOR
Filed May 31, 1930   2 Sheets-Sheet 1

INVENTOR
William R. Paulsen
By Brown & Critchlow
Attorneys.

Aug. 9, 1932.  W. R. PAULSEN  1,870,264
REGULATOR
Filed May 31, 1930  2 Sheets-Sheet 2

INVENTOR
William R. Paulsen
By Brown & Critchlow
Attorneys.

Patented Aug. 9, 1932

1,870,264

UNITED STATES PATENT OFFICE

WILLIAM R. PAULSEN, OF PITTSBURGH, PENNSYLVANIA

REGULATOR

Application filed May 31, 1930. Serial No. 458,060.

This invention pertains to fluid proportioning apparatus, and relates more particularly to an improved form of flow controlling apparatus for automatically regulating the flow of fluid through one of two conduits in a constant predetermined proportion to that in the other.

The primary object of the invention is to provide an improved form of apparatus of this character which is simple of construction, comparatively inexpensive to manufacture and operate, and also sensitive and dependable in operation.

Another object is to provide an apparatus having the above-noted characteristics which is especially adapted for use in controlling the rate of flow of air to a gas burning furnace in accordance with the supply of gas, in such a way as to properly support the combustion of the gas at all times, independently of whether the gas is supplied from a constant or variable source.

Figure 1:
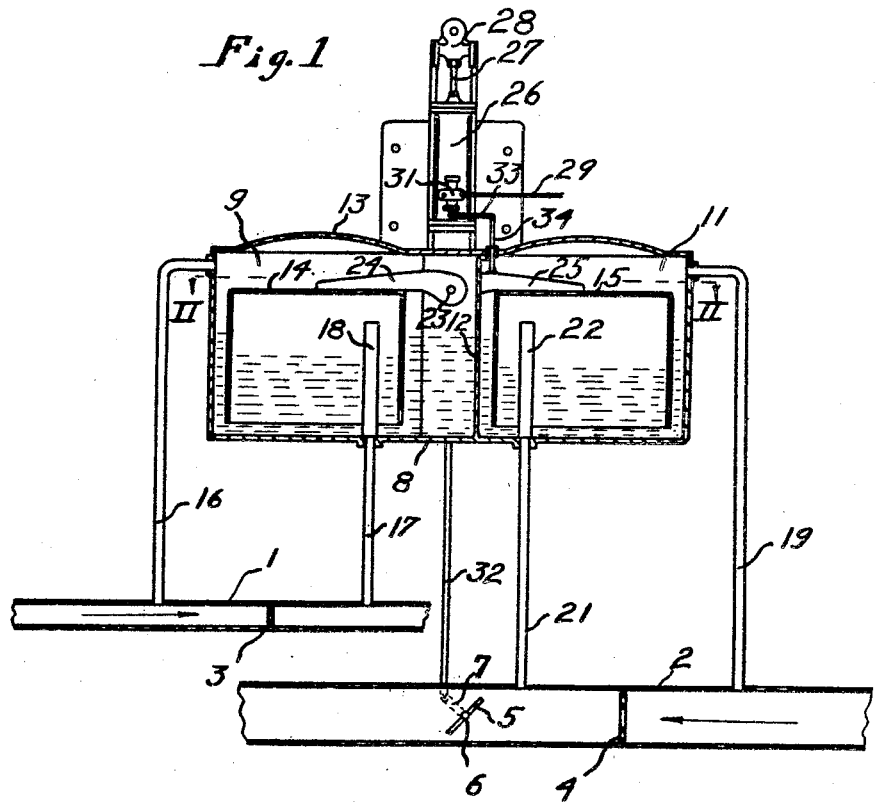
Figure 2:
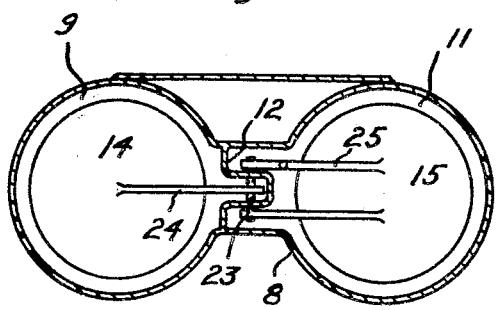

These and other objects, as well as the various other features of the invention, will become more apparent when the following detailed description is read in conjunction with the accompanying drawings of which Fig. 1 is a diagrammatic view, partly in section and partly in elevation, of one form of a control apparatus constructed in accordance with the invention; Fig. 2 a horizontal section taken on the line II—II of Fig. 1; and Fig. 3 a view similar to Fig. 1 of another modification of the invention.

In practicing the invention, a reservoir containing a quantity of sealing liquid is associated with each of the fluid transporting conduits in which it is desired to maintain the rate of flow of the fluids in some predetermined constant ratio. A bell is arranged in each of these reservoirs with its open end submerged in the sealing liquid contained therein, and provision is made in each of the conduits for producing a difference of pressures which vary in accordance with the rate of flow of the fluids passing therethrough. The pressures so produced in each conduit are communicated to the interior and exterior of the bells disposed in the associated reservoirs, and the bells thereby rendered responsive to the variations in the rates of flow of the two fluids. To utilize the relative movement of the bells produced by the variations in the pressures acting upon them when the rate of flow of the fluids in the conduits change, the bells are coupled together so that they move relative to each other. This movement is employed to operate a flow controlling valve provided in one of the conduits whereby the fluid flowing therethrough is caused to flow in accordance with that in the other conduit independently of the variations in the rate of flow occurring in the latter.

Referring now to the drawings, a pair of conduits 1 and 2 are shown which may be assumed to be employed for transporting, respectively, a supply of gas, and a supply of air for supporting the combustion of the gas to the combustion chamber of a gas burning furnace (not shown). In these two conduits there are arranged a pair of restrictions 3 and 4, which, as is well known in the art, produce a drop of pressure across, or a difference in pressure on, their two sides when there is a flow of fluid in the conduits, and which varies in a constant proportion to the rate of flow of the fluids. To utilize these differences of pressures for controlling the flow of air in conduit 2 in accordance with the flow of gas in conduit 1, a flow controlling apparatus is provided which in accordance with the invention is adapted to operate a flow valve 5 located in conduit 2. This valve is mounted on a pivotally supported arbor 6 which is provided with an arm 7 for effecting its movement.

Referring more particularly to the embodiment of the invention shown in Figs. 1 and 2, a control apparatus proper is there illustrated which comprises an elongate tank 8 that is divided into two circular shaped reservoirs 9 and 11 by a U-shaped partition 12. It will be appreciated that these reservoirs may be made in other shapes, but for simplicity it is preferred to make them in the form shown in Fig. 2. Over the top of the two there is mounted a cover plate 13 which renders them gas tight. In the two there are arranged, in an inverted manner, a pair of bells 14 and 15, respectively. Reservoir 9 and bell 14 are associated with gas conduit 1, and reservoir 11 and bell 15 with air conduit 2, and to permit fluid pressure to be impressed on both the interior and exterior of the bells, a sufficient quantity of some suitable sealing liquid, such as a light oil, is provided in both reservoirs to adequately cover the lower ends of the bells.

In practicing the invention, the pressure on the high pressure side of restriction 3 in conduit 1 is impressed on the exterior of bell 14 by means of a pipe 16 connected between the top of reservoir 9 and conduit 1, on the inlet side of restriction 3, assuming the gas flows in the conduit in the direction indicated by the arrow, while the pressure on the low pressure side of restriction 3 is communicated to the interior of the bell by means of a pipe 17 connected between conduit 1 on the low pressure side of restriction 3 and the bottom of the reservoir below the bell, and an extension 18 which extends from the end of pipe 17 into the interior of the bell. By reason of this arrangement, bell 14 is rendered responsive to the differential of the pressures on the two sides of restriction 3, and in a similar manner by means of pipes 18 and 21, and an extension 22, bell 15 is rendered responsive to the differential of the pressures on the two sides of restriction 4 in the air conduit.

In order that the movement of the bells produced by variations in the pressures in the conduits, or in other words, by changes in the rate of flow of the gas and air, may be utilized to control the flow of the air in accordance with that of the gas, the two bells are pivotally connected together, and in turn operably coupled to valve 5. To accomplish such end, a shaft 23 is passed in a rotatable and leak-tight fashion through the side portions 12a and near the top of partition 12. A lever 24 mounted on the top of bell 14 is keyed to the center of this shaft on the inside of reservoir 9, and a pair of levers 25 mounted on the top of bell 15 are keyed to its ends which extend through partition 12 into reservoir 11. Hence with each variation in the pressures in either of the reservoirs a change is effected in the relative position of the bells, it being appreciated that the bells are free to move in response to the pressures acting on them, and that the difference in pressures on one operates in opposition to that on the other.

For operating valve 5 in response to the relative movement of the bells, a connection may be made directly between the levers extending between the bells and arm 7, but preferably some means actuated by some suitable outside source or power is interposed between the regulating apparatus and valve 5 to render the operation of the valve more sensitive. It will be readily appreciated that by relieving the bells of the load of operating valve 5, and relying upon them only for actuating some simple means utilized for controlling a source of power employed for actuating the valve 5, the sensitivity and dependability of operation of the mechanism is considerably enhanced. While various forms of motors, or the like, may be employed for this purpose, it is preferred to employ a mechanism of the type illustrated and described in Patent No. 1,371,243, granted to John M. Hopewood, March 15, 1921.

Such a mechanism consists chiefly of a piston and cylinder 26 suitably mounted on the side of the reservoirs. A piston rod 27 having a connecting member 28 mounted on its free end is secured to the piston, and between this connecting member and the arm 7 mounted on the arbor supporting valve 5 there is connected a rod 32. For operating the piston any suitable source of fluid pressure, such as air under pressure, is communicated to the cylinder by a supply line 29 in which there is arranged a valve 31 for controlling the operation of the piston. For controlling the operation of valve 31, a lever 33, and connecting link 34, are connected between it and one of the levers 25 mounted on the top of bell 15. With this arrangement, the operation of the piston is controlled by the relative position of the two bells which in turn is determined by the rate of flow of fluids in conduits 1 and 2. To prevent leakage of pressure from reservoir 11 about connecting link 34a, where it passes through cover plate 13, a suitable packing is provided about it in the cover plate.

In constructing the apparatus, restrictions 3 and 4 preferably should be made of such dimensions that, in the normal operation of the system, the pressure differential produced on the two sides of the two will be substantially equal, independently of the volume of gas and air passing through the two conduits. For example, suppose that blast furnace gas is being normally supplied to a furnace through conduit 1 at the rate of 6000 cubic feet per hour, and that air at the rate of 4500 cubic feet per hour is supplied through conduit 2 to support the combustion of the gas. To provide the proper operation of the mechanism the two restrictions should be of such dimensions that the pressure drops across the two restrictions are substantially the same when such rates of flow occur, as for example, one inch, while these respective rates of flow are maintained. As will be understood, if the rate of flow of gas increases, the pressure drop across restriction 3 will rise. This will cause a pressure increase on the top of bell 14 which is greater than the increase in pressure on the inside of the bell. When such a condition is established, bell 14 is forced downward against the opposition of the forces acting on bell 15, which may not have changed, with the result that bell 14 moves downward and bell 15 upward. Such a change in position of the bells causes levers 25 to actuate valve 31 in a direction to increase the pressure in cylinder 26, in response to which the piston in the cylinder is caused to move upward and open valve 5. With the opening of valve 5 the resistance to the flow of air in conduit 2 is decreased, and the rate of flow of the air thereby increases until the drop in pressure across restriction 4 substantially equals that across restriction 3.

When the flow of gas through conduit 1 moves toward normal, the drop in pressure in conduit 2 becomes greater than that in conduit 1, and as a result a reverse of the above-described operation takes place, causing valve 5 to be moved to reduce the flow of air. Hence, the flow of air in conduit 2 is automatically regulated in such a manner that the volume of air supplied the furnace is at all times in a definite proportion to that of the gas.

Figure 3:
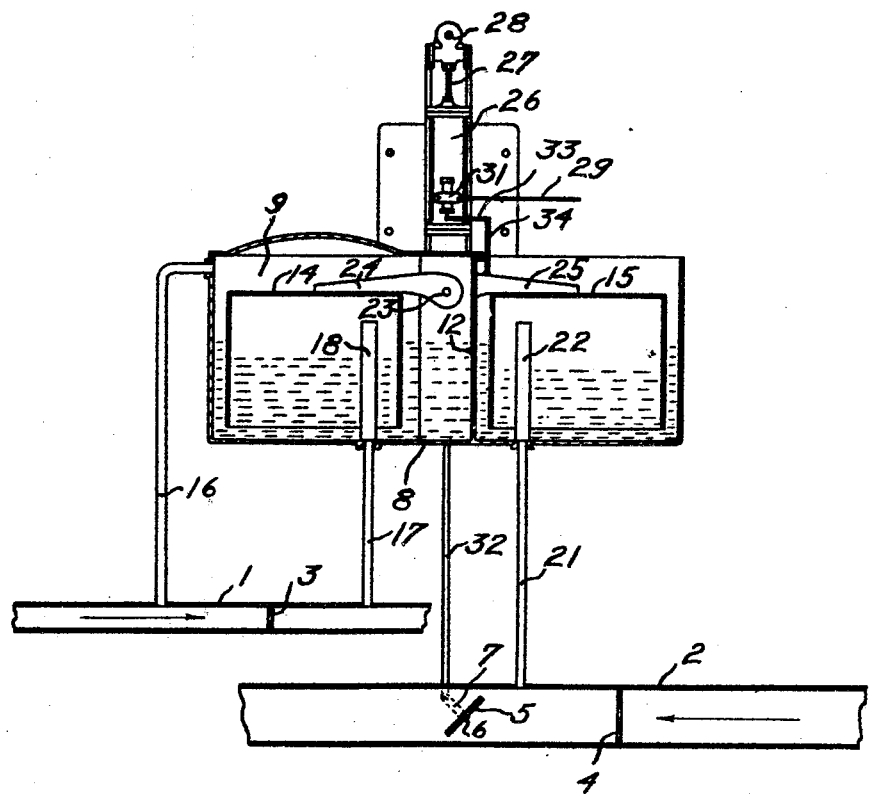

In many installations instead of the air being pumped or forced under a head pressure through the air supply conduit into the furnace, it is drawn by means of some suitable apparatus, such as a fan, through the conduit and by it forced into the furnace. Where the air is supplied in such a manner the rate of flow in the air conduit varies in proportion to the difference between the pressure in the conduit, and that of the atmosphere. Consequently, in such systems to practice the invention the only pressure that need be impressed on the top of bell 15, to render the apparatus operable to control the flow of air, is that of the atmosphere. In Fig. 3 there is shown a simplified embodiment of the invention which is adapted for use in a system in which such a provision is made for supplying the air to the furnace. This latter embodiment differs from the former only in that the portion of plate 13, covering reservoir 11, and the pipe 19, connected between the reservoir and conduit 2, are removed. Restriction 4 may also be removed, but it is not required, and in some instances it may be essential to use it, as will be readily appreciated, to obtain the proper pressure in the interior of bell 15 to counteract the pressure differential acting on bell 14.

An advantage of this latter modification of the invention over the former is that it is simpler of construction and by reason of the elimination of the portion of cover 13 extending over reservoir 11 no packing is required about the valve actuating connecting link 34.

The chief advantages of a control apparatus embodying the invention as set forth above are, in addition to its simple, inexpensive and rugged construction, its dependability and the sensitivity of its operation, which will be more fully appreciated when it is considered that the only resistance offered to the movement of the regulating bells, in addition to the opposing pressures in the two reservoirs, and the force necessary to operate valve 31 which is negligible, is the resistance offered by the sealing liquid, which is practically negligible because only very light oils or sealing liquids need be employed. This is made possible because the two pressures in each reservoir are normally nearly the same, differing only by comparatively small amounts.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A pressure regulating mechanism comprising a container divided by a partition into two separate compartments each having a quantity of liquid provided therein, an inverted bell arranged in each of said compartments with its lower end immersed in said liquid, a support pivoted in said partition, means rigidly attaching each of said bells to said pivoted support whereby the movement of one results in a corresponding movement of the other, and means for communicating fluid pressure to the interior and exterior of said bells.

2. A flow controlling apparatus comprising two fluid transporting conduits one of which is provided with a flow controlling valve, means for creating a pressure differential in the fluid which flows through each of said conduits, a container divided by a partition into two separate compartments, a supply of liquid in each of said compartments, an inverted bell arranged in each of the compartments with the lower end thereof immersed in said liquid, a support pivoted in the said partition, means rigidly attaching each of said bells to said pivoted support, means for applying to the interior and exterior of each of said bells the differential fluid pressure of its associated conduit, and means responsive to the movement of said bells for actuating said valve to control the flow through one with relation to the other of said conduits.

3. A regulator of the class described comprising a tank having a vertically disposed partition of U-shaped cross section dividing it into two separate compartments, an inverted bell arranged in each of said compartments with its lower end immersed in a supply of liquid provided in each compartment, a shaft rotatably mounted in said partition and extending into each of said compartments, a lever rigidly connecting each of said bells to said shaft whereby movement of one produces a corresponding movement in the other, means for communicating fluid pressure to the interior and exterior of each bell, and means for transmitting the resultant movement of the bells produced by variations in said pressure to a point exteriorly of the apparatus.

In testimony whereof, I sign my name.

WILLIAM R. PAULSEN.